US012760730B2

United States Patent

(12) United States Patent
Sakai

(10) Patent No.: US 12,760,730 B2
(45) Date of Patent: Oct. 13, 2026

(54) REFRIGERANT CIRCUIT MODULE

(71) Applicant: DENSO CORPORATION, Kariya-city (JP)

(72) Inventor: Koji Sakai, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 0 days.

(21) Appl. No.: 19/330,616

(22) Filed: Sep. 16, 2025

(65) Prior Publication Data

US 2026/0018962 A1 Jan. 15, 2026

Related U.S. Application Data

(63) Continuation of application No. PCT/JP2024/004767, filed on Feb. 13, 2024.

(30) Foreign Application Priority Data

Mar. 22, 2023 (JP) ................................ 2023-045266

(51) Int. Cl.
*F04C 18/02* (2006.01)
*F04C 23/00* (2006.01)
(Continued)

(52) U.S. Cl.
CPC ........ *F04C 18/0215* (2013.01); *F04C 23/008* (2013.01); *H02K 5/22* (2013.01);
(Continued)

(58) Field of Classification Search
CPC ................ F04C 18/0215; F04C 23/008; F04C 2240/30; F04C 2240/40; F04C 2240/403;
(Continued)

(56) References Cited

U.S. PATENT DOCUMENTS 8,698,364 B2 * 4/2014 Saito .................... F04C 23/008 366/229
9,394,905 B2 * 7/2016 Kinoshita .............. F01C 21/10
(Continued)

FOREIGN PATENT DOCUMENTS

CN 202334076 U 7/2012
JP 2003-222078 A 8/2003
(Continued)

*Primary Examiner* — Peter J Bertheaud
(74) *Attorney, Agent, or Firm* — Harness, Dickey & Pierce, P.L.C.

(57) ABSTRACT

A refrigerant circuit module configured to compress a refrigerant includes an electric motor, a first housing, a second housing, a coupler, a drive device and a connector. The second housing receives the electric motor and is disposed in the first housing. The coupler is securely held relative to both a first inner wall surface of the first housing and a second outer wall surface of the second housing. The drive device is configured to drive the electric motor and is positioned on a first outer wall surface of the first housing. The connector is coupled to the drive device and includes a shield. A first noise path extends from the second housing to the shield via the coupler, the first housing and the outer wall surface of the drive device to conduct the electrical noise generated by the electric motor.

6 Claims, 6 Drawing Sheets

(51) Int. Cl.

| | |
|---|---|
| ***H02K 5/22*** | (2006.01) |
| ***H02K 7/14*** | (2006.01) |
| ***H02K 11/01*** | (2016.01) |
| ***H02K 11/02*** | (2016.01) |
| ***H02K 11/33*** | (2016.01) |
| ***H02K 11/40*** | (2016.01) |

(52) U.S. Cl.
CPC ............... *H02K 5/225* (2013.01); *H02K 7/14* (2013.01); *H02K 11/0141* (2020.08); *H02K 11/02* (2013.01); *H02K 11/33* (2016.01); *H02K 11/40* (2016.01); *F04C 2240/30* (2013.01); *F04C 2240/40* (2013.01); *F04C 2240/403* (2013.01); *F04C 2240/803* (2013.01); *F04C 2240/808* (2013.01)

(58) Field of Classification Search
CPC ......... F04C 2240/803; F04C 2240/808; H02K 5/22; H02K 5/225; H02K 7/14; H02K 11/0141; H02K 11/02; H02K 11/33; H02K 11/40
See application file for complete search history.

(56) References Cited

U.S. PATENT DOCUMENTS

| | | | | |
|---|---|---|---|---|
| 9,447,924 | B2 * | 9/2016 | Fukasaku .............. | F04C 23/008 |
| 2003/0143090 | A1 | 7/2003 | Iritani et al. | |
| 2009/0068047 | A1 * | 3/2009 | Koitabashi .......... | F04C 18/0215 417/410.5 |
| 2010/0181876 | A1 * | 7/2010 | Watanabe .............. | H02K 11/33 310/68 D |
| 2014/0225464 | A1 | 8/2014 | Honda et al. | |

FOREIGN PATENT DOCUMENTS

| | | | |
|---|---|---|---|
| JP | 2004-274992 | A | 9/2004 |
| JP | 2012-107539 | A | 6/2012 |
| JP | 2015-039282 | A | 2/2015 |

* cited by examiner

REFRIGERANT CIRCUIT MODULE

CROSS REFERENCE TO RELATED APPLICATIONS

This application is a continuation application of International Patent Application No. PCT/JP2024/004767 filed on Feb. 13, 2024, which designated the U.S. and claims the benefit of priority from Japanese Patent Application No. 2023-45266 filed on Mar. 22, 2023. The entire disclosures of all of the above applications are incorporated herein by reference.

TECHNICAL FIELD

The present disclosure relates to a refrigerant circuit module.

BACKGROUND

Previously, an electric motor, which generates a drive force for compressing a refrigerant in a vehicle air conditioning apparatus, has been proposed for use in a refrigerant circuit module. A stator of the electric motor is disposed in an inside space of a housing and is directly fixed to an inner wall surface of the housing.

SUMMARY

This section provides a general summary of the disclosure, and is not a comprehensive disclosure of its full scope or all of its features.

According to the present disclosure, there is provided a refrigerant circuit module configured to compress a refrigerant. The refrigerant circuit module may include an electric motor, a first housing, a second housing, a coupler, a drive device and a connector. The first housing may have a first space. The second housing may have a second space in which the electric motor is received. The second housing may be disposed in the first space of the first housing. The coupler may be securely held relative to both a first inner wall surface of the first housing and a second outer wall surface of the second housing. The coupler may hold the second housing in the first space of the first housing such that the first inner wall surface of the first housing and the second outer wall surface of the second housing do not contact each other. The drive device may be positioned on a first outer wall surface of the first housing. The drive device may be configured to drive the electric motor. The connector may be coupled to the drive device and may include a shield which is configured to conduct electrical noise and is connected to an outer wall surface of the drive device that is electrically connected to the first outer wall surface of the first housing. A first noise path, which extends from the second housing to the shield of the connector via the coupler, the first housing and the outer wall surface of the drive device, may be configured to conduct the electrical noise generated by the electric motor.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
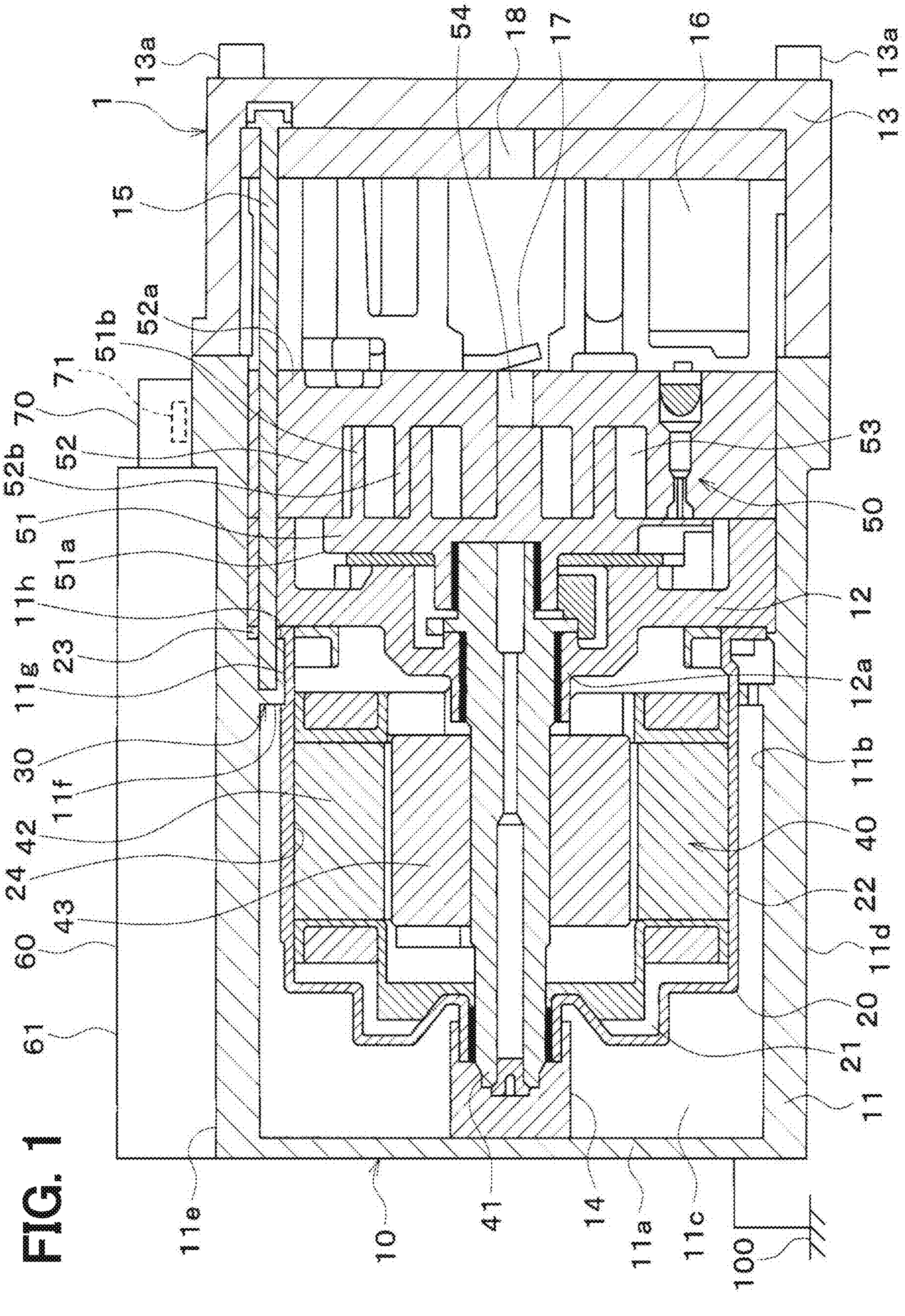
FIG. 1 is a cross-sectional view of a refrigerant circuit module according to a first embodiment.

Previously, an electric motor, which generates a drive force for compressing a refrigerant in a vehicle air conditioning apparatus, has been proposed for use in a refrigerant circuit module. A stator of the electric motor is disposed in an inside space of a housing and is directly fixed to an inner wall surface of the housing.

However, in the above-described technique, the housing is connected, for example, to a vehicle body ground (GND) of a vehicle, and thereby electrical noise, which is generated by the electric motor, flows to the vehicle body GND via the housing. Since the stator is directly fixed to the inner wall surface of the housing, a path of the electrical noise is formed over a wide area of the housing.

Then, the electrical noise flows through a large conduction noise loop formed by, for example, the electric motor, the vehicle body GND, an in-vehicle battery, and a wiring that connects the in-vehicle battery and the motor. For this reason, the electromagnetic compatibility (EMC) characteristics may be degraded. In order to block the noise path of the conduction noise loop, it becomes necessary to take measures such as electrically insulating a contact portion between the housing and the stator.

According to one aspect of the present disclosure, there is provided a refrigerant circuit module configured to compress a refrigerant. The refrigerant circuit module includes an electric motor, a first housing, a second housing, a coupler, a drive device and a connector. The first housing has a first space. The second housing has a second space in which the electric motor is received. The second housing is disposed in the first space of the first housing. The coupler is securely held relative to both a first inner wall surface of the first housing and a second outer wall surface of the second housing. The coupler holds the second housing in the first space of the first housing such that the first inner wall surface of the first housing and the second outer wall surface of the second housing do not contact each other. The drive device is positioned on a first outer wall surface of the first housing. The drive device is configured to drive the electric motor. The connector is coupled to the drive device and includes a shield which is configured to conduct electrical noise and is connected to an outer wall surface of the drive device that is electrically connected to the first outer wall surface of the first housing. A first noise path, which extends from the second housing to the shield of the connector via the coupler, the first housing and the outer wall surface of the drive device, is configured to conduct the electrical noise generated by the electric motor.

Accordingly, even when the electrical noise, which is generated by the electric motor, flows throughout the second housing, the electrical noise flows into the first housing via the coupler. Therefore, the electrical noise is likely to flow from the first housing to the ground (GND) of the drive device or the shield of the connector, both of which are located adjacent to the coupler. Therefore, even when the first housing is connected to the vehicle body ground (GND), the electrical noise is less likely to flow to the vehicle body GND. Furthermore, since the electrical noise can flow through a small conduction noise loop, which is formed between the connector and devices electrically connected to the connector, the EMC characteristics can be improved. Accordingly, it is possible to limit a deterioration in the EMC characteristics caused by the electrical noise flowing through a large conduction noise loop that includes the vehicle body GND.

Hereinafter, embodiments of the present disclosure will be described with reference to the drawings. In each of the following embodiments, the same reference signs may be assigned to portions that are the same as or equivalent to those described in the preceding embodiment(s), and the description thereof may be omitted. Further, when only any one or more of the components are described in the embodiment, the description of the rest of the components described in the preceding embodiment may be applied to the rest of the components. In addition to the combinations of portions that are specifically shown to be combinable in the respective embodiments, it is also possible to partially combine the embodiments even if they are not specifically shown, provided that the combinations are not impeded.

First Embodiment

Next, the first embodiment will be described with reference to the drawings. A refrigerant circuit module of the present embodiment is applied to a vapor compression refrigeration cycle for adjusting the temperature of blown air to be supplied into a vehicle cabin, for example, in a vehicle air-conditioning apparatus. The refrigerant circuit module is configured to compress and discharge a refrigerant in the refrigeration cycle.

The refrigeration cycle includes: a condenser configured to release heat from a high-pressure refrigerant by exchanging heat between the high-pressure refrigerant discharged from the refrigerant circuit module and outside air; an expansion valve configured to decompress the refrigerant that has released heat in the condenser; and an evaporator configured to evaporate the low-pressure refrigerant by exchanging heat between the low-pressure refrigerant decompressed by the expansion valve and blown air. The refrigeration cycle is formed by connecting the condenser, the expansion valve, the evaporator and the refrigerant circuit module in a loop via refrigerant pipes.

In the refrigeration cycle, an HFC-based refrigerant such as R134a is employed as the refrigerant. Accordingly, a subcritical refrigeration cycle is formed in which the high-pressure refrigerant pressure does not exceed the critical pressure of the refrigerant. Of course, an HFO-based refrigerant such as R1234yf may also be employed as the refrigerant. Furthermore, the refrigerant is mixed with refrigeration oil (lubricant oil) for lubricating sliding portions inside the refrigerant circuit module. A portion of the refrigeration oil circulates through the cycle together with the refrigerant.

Next, the structure of the refrigerant circuit module will be described. The refrigerant circuit module is disposed, for example, in an engine compartment of a vehicle. The refrigerant circuit module is configured as an electric compressor that operates upon receiving electric power.

In the present embodiment, as shown in FIG. 1, the refrigerant circuit module 1 includes a first housing 10, a second housing 20, a coupler 30, an electric motor 40, a scroll-type compression mechanism 50 (hereinafter simply referred to as the compression mechanism 50), a drive device 60 and a connector 70.

Specifically, in the refrigerant circuit module 1, the first housing 10 receives: the second housing 20, in which the electric motor 40 is received; and a shaft 41. The electric motor 40 is configured to rotationally drive the compression mechanism 50. The shaft 41 is formed as a rotatable shaft that is configured to transmit rotational drive force from the electric motor 40 to the compression mechanism 50.

It should be noted that, in the refrigerant circuit module 1, a rotational axis of the shaft 41 extends in a horizontal direction, and the compression mechanism 50 and the electric motor 40 are arranged in the horizontal direction. The refrigerant circuit module 1 is configured as a so-called horizontally mounted type.

The first housing 10 forms an outer shell of the refrigerant circuit module 1. The first housing 10 has a sealed container structure formed by assembling a plurality of metal members. The first housing 10 is made of, for example, a metal material such as aluminum (Al). The first housing 10 includes a front housing 11, a middle housing 12 and a rear housing 13.

The front housing 11 is a container that is shaped in a bottomed tubular form. For example, the front housing 11 is shaped in a bottomed cylindrical tubular form.

It should be noted that the shape of the front housing 11 is not limited to the bottomed cylindrical tubular form and may be any bottomed tubular form. Alternatively, the front housing 11 may not necessarily have the bottomed cylindrical tubular form. For example, the front housing 11 may be formed such that a bottom portion and a tubular portion of the front housing 11 are formed separately and are assembled together with a seal or the like interposed therebetween.

The front housing 11 includes a motor-side bearing 14. The motor-side bearing 14 is fixed to a bottom portion 11*a* of the front housing 11, which forms one side portion of the front housing 11 in the axial direction of the shaft 41. Furthermore, the front housing 11 is electrically connected to the vehicle body ground (GND) 100 of the vehicle.

The middle housing 12 is shaped in a substantially circular disk form and includes a compression-mechanism-side bearing 12*a* installed to a substantially central portion of the middle housing 12. The middle housing 12 is disposed inside the front housing 11. An outer peripheral surface of the middle housing 12 is press-fitted into a first inner wall surface 11*b* of the front housing 11. As a result, the middle housing 12 partitions an inside space of the front housing 11. That is, the first housing 10 has a first space 11*c* defined by the front housing 11 and the middle housing 12.

The rear housing 13 closes an opening of the front housing 11. The rear housing 13 is fixed to the front housing 11 by a plurality of screws 13*a* arranged in the circumferential direction.

The front housing 11, the middle housing 12 and the rear housing 13 are integrated by means such as press-fitting or bolting with the screws 13*a*. In addition, a seal member (not shown) such as an O-ring or a gasket is interposed at an interface between each pair of the front housing 11, the middle housing 12 and the rear housing 13. Therefore, the refrigerant does not leak from the interfaces.

A suction port (not shown) is formed in the bottom portion 11*a* of the front housing 11 to draw in low-pressure refrigerant from the outside of the first housing 10. The low-pressure refrigerant is the refrigerant that is outputted from the evaporator of the refrigeration cycle. The suction port is connected to the first space 11*c*. Therefore, the low-pressure refrigerant, which is drawn through the suction port, flows into the first space 11*c*.

A flat surface 11*e*, which extends substantially in the horizontal direction, is formed on a first outer wall surface 11*d* of a tubular portion of the front housing 11. The drive device 60, which supplies electric power to the electric motor 40, is positioned on the flat surface 11*e*. Therefore, in the refrigerant circuit module 1, the electric motor 40 and the drive device 60 can be cooled by the low-pressure refrigerant that flows into the first space 11*c* from the suction port.

It should be noted that the components of the first housing 10 are not limited to the housings 11 to 13 described above. For example, the first housing 10 may be formed by four or more components.

The second housing 20 is a component shaped in a bottomed cylindrical tubular form and has a second space 21. The second housing 20 is a cup-shaped housing made of, for example, a metal material such as iron (Fe) or an electromagnetic steel sheet. The second housing 20 receives the electric motor 40 in the second space 21. The second housing 20 is disposed in the first space 11*c* of the first housing 10.

In the present embodiment, a suction port, which supplies the low-pressure refrigerant from the first housing 10 into the second housing 20, is not provided. In addition, the second housing 20 is in an unsealed state.

It should be noted that a suction port, which is configured to draw in the low-pressure refrigerant from the first space 11*c* of the first housing 10, may be formed in the second housing 20. In this case, the suction port of the second housing 20 is connected to the second space 21. Therefore, the low-pressure refrigerant, which is drawn through the suction port of the second housing 20, flows into the second space 21.

The coupler 30 holds the second housing 20 in the first space 11*c* of the first housing 10 such that the first inner wall surface 11*b* of the front housing 11 of the first housing 10 and a second outer wall surface 22 of the second housing 20 do not contact each other. That is, the coupler 30 keeps the first inner wall surface 11*b* of the front housing 11 and the second outer wall surface 22 of the second housing 20 away from each other. In the present embodiment, the coupler 30 includes: a projection 11*f*, which is formed integrally in one piece with the first housing 10; and a flange 23, which is formed integrally in one piece with the second housing 20.

The projection 11*f* is a portion of the first inner wall surface 11*b* of the front housing 11 that projects toward the shaft 41. The projection 11*f* is shaped in a ring form which extends in a circumferential direction of the front housing 11. It should be noted that the projection 11*f* may be provided intermittently in the circumferential direction of the front housing 11.

The flange 23 is a portion formed by radially outwardly projecting an open end of the second housing 20. The flange 23 is formed to extend circumferentially around the entire periphery of the second housing 20. It should be noted that, like the projection 11*f*, the flange 23 may be provided intermittently in the circumferential direction of the second housing 20.

A through-hole (not shown), which is configured to conduct the low-pressure refrigerant therethrough, is formed in the coupler 30. Therefore, the low-pressure refrigerant, which is drawn into the first space 11*c* through the suction port of the front housing 11, flows toward the middle housing 12.

It should be noted that, in the case where the projection 11*f* and the flange 23, which form the coupler 30, are formed intermittently, a space(s) for allowing the low-pressure refrigerant to pass is ensured even without forming the through-hole in the coupler 30. In addition, the refrigerant may be circulated through a gap at the second housing 20 or through an air gap between a stator 42 and a rotor 43, which will be described later.

A distal end surface (radial end surface) 11*g* of the projection 11*f* contacts the second outer wall surface 22 of the second housing 20. In addition, the flange 23 contacts an opening-side end surface 11*h* of the projection 11*f* which axially faces toward the opening of the front housing 11. The projection 11*f* and the flange 23 are fixed together by a plurality of screws 15 arranged in the circumferential direction. In the present embodiment, each of the screws 15 has a length that is sufficient to reach the coupler 30 from the rear housing 13 side via the middle housing 12 and fixes the projection 11*f* and the flange 23 together.

As a result, the second housing 20 is fixed to the first housing 10 such that the second outer wall surface 22 of the second housing 20 does not contact the first inner wall surface 11*b* of the first housing 10. In other words, the second housing 20 is held in the first space 11*c* of the first housing 10 via the coupler 30 in a suspended state without being in contact with the first housing 10.

It should be noted that the screws 15 only need to be capable of fixing the projection 11*f* and the flange 23 together, and the screws 15 may be short. In addition, the method for fixing the projection 11*f* and the flange 23 together is not limited to the use of the screws 15, and other methods such as welding may be employed. In addition, the coupler 30 only needs to be securely held relative to both the first inner wall surface 11*b* of the first housing 10 and the second outer wall surface 22 of the second housing 20. Therefore, the coupler 30 may be provided only on the first housing 10 or only on the second housing 20. Alternatively, the coupler 30 may be formed as a separate component that is formed separately from both the first housing 10 and the second housing 20.

The electric motor 40 outputs rotational drive force to drive the compression mechanism 50. The electric motor 40 is disposed in the second space 21, which is located on the radially inner side of the tubular portion of the second housing 20. The electric motor 40 includes the stator 42 serving as a stationary element and the rotor 43 serving as a rotating element.

The stator 42 is fixed to a second inner wall surface 24 of the second housing 20. The stator 42 is formed by winding stator coils around a stator core made of a magnetic material. When the electric power is supplied to the stator coils from the drive device 60, a rotating magnetic field is generated to rotate the rotor 43.

The rotor 43 includes a plurality of permanent magnets. The rotor 43 is placed on a radially inner side of the stator 42. Furthermore, the rotor 43 is shaped in a cylindrical form that extends in an axial direction of a rotational axis of the rotor 43. A portion of the shaft 41 made of metal is securely press fitted into a central axial hole of the rotor 43, so that the rotor 43 is fixed to the shaft 41.

An axial length of the shaft 41 is larger than an axial length of the rotor 43. An axial end portion of the shaft 41 is rotatably supported by the motor-side bearing 14 which is installed to the bottom portion 11*a* of the front housing 11. The other axial end portion of the shaft 41, which is placed adjacent to the compression mechanism 50, is rotatably supported by the compression-mechanism-side bearing 12*a* installed to the middle housing 12. Accordingly, when the electric power is supplied to the stator coils of the stator 42 to generate the rotating magnetic field, the rotor 43 and the shaft 41 are rotated integrally.

The compression mechanism 50 includes a movable scroll 51 and a stationary scroll 52, which are formed as a pair of scrolls and are made of a metal material, such as an aluminum alloy. Each of the movable scroll 51 and the stationary scroll 52 includes: a base plate, which is shaped in a flat plate form, and a wrap, which is shaped in a spiral form and projects from the base plate in the axial direction of the shaft 41.

Specifically, the movable scroll 51 includes: a movable base plate 51*a*, which is shaped in a circular plate form; and a movable wrap 51*b*, which is shaped in a spiral form and projects from the movable base plate 51*a* toward the stationary scroll 52. The stationary scroll 52 includes: a stationary base plate 52*a*, which is shaped in a circular plate form; and a stationary wrap 52*b*, which is shaped in a spiral form and projects from the stationary base plate 52*a* toward the movable scroll 51.

Further, the stationary scroll 52 is fixed to the front housing 11 by press-fitting an outer peripheral surface of the stationary base plate 52*a* into the first inner wall surface 11*b* of the front housing 11. The movable scroll 51 is placed in a space formed between the middle housing 12 and the stationary scroll 52.

The movable scroll 51 and the stationary scroll 52 are arranged such that a plate surface of the base plate 51*a* and a plate surface of the base plate 52*a* are opposed to each other. The movable scroll 51 and the stationary scroll 52 are arranged such that the wraps 51*b*, 52*b* are meshed with each other, and a distal end of the wrap 51*b*, 52*b* of each of the scrolls 51, 52 is in contact with the base plate 51*a*, 52*a* of the other one of the scrolls 51, 52.

As a result, the wraps 51*b*, 52*b* are brought into contact with each other at a plurality of locations, and thereby a plurality of working chambers 53, each having a crescent shape when viewed in the axial direction of the rotational axis of the shaft 41, are formed between the wraps 51*b*, 52*b*. In FIG. 1, for clarity of illustration, only one of the plurality of working chambers 53 is denoted with a reference sign, and the other working chambers are not labeled.

The middle housing 12 of the present embodiment is formed with a suction-side communication passage that places the working chamber 53, which is displaced to the radially outermost side and has a maximum volume, in communication with the first space 11*c*.

A discharge hole 54, which is configured to discharge the refrigerant compressed in the working chamber 53, is formed at the center of the stationary base plate 52*a* of the stationary scroll 52. The discharge hole 54 is communicated with a discharge chamber 16, which is configured to receive the high-pressure refrigerant compressed in the working chamber 53. A reed valve 17 is disposed in the discharge chamber 16. The reed valve 17 limits backflow of the refrigerant from the discharge chamber 16 to the working chamber 53 through the discharge hole 54.

The discharge chamber 16 is defined by a space between the stationary scroll 52 and the rear housing 13. A separating structure is provided in the discharge chamber 16 to separate the refrigeration oil from the high-pressure refrigerant which contains the refrigeration oil.

The refrigeration oil, which is separated in the discharge chamber 16, is guided to sliding portions of the compression mechanism 50 and the electric motor 40 through an oil passage (not shown) formed in the rear housing 13, the stationary scroll 52 and the middle housing 12. Meanwhile, the high-pressure refrigerant, which is separated in the discharge chamber 16, is guided to a discharge port 18. The discharge port 18 is formed in the rear housing 13 and is configured to discharge the high-pressure refrigerant to the outside of the first housing 10.

The drive device 60 is a device configured to control the operation of the electric motor 40. The drive device 60 has electric circuit components which include: a switching circuit configured to convert a DC voltage from a high-voltage battery into an AC voltage; a filter circuit configured to absorb noise generated by the operation of the switching circuit; and a drive circuit configured to operate respective switching elements 4 of the switching circuit.

The switching circuit is a circuit configured to generate AC voltages and currents for three phases, which include a U-phase, a V-phase and a W-phase, to drive the high-voltage electric motor 40. The filter circuit includes components such as capacitors and resistors.

The drive circuit controls the electric current supplied to each phase of the electric motor 40 so that the electric motor 40 outputs a predetermined torque. Furthermore, the drive circuit performs detection of voltage and current required to drive the electric motor 40, outputs switching signals, and executes various control calculations. The drive device 60 also operates other functional components included in the refrigerant circuit module 1.

The drive device 60 is formed such that a circuit board, on which the above-described circuits are formed, is received in a metal case made of metal. The metal case is electrically connected to a ground (GND) of the respective circuits. Accordingly, a ground (GND) of the drive device 60 is electrically connected to the front housing 11. Here, for example, at least a portion of the metal case (see the metal case with an outer wall surface 61 shown in FIGS. 1 and 2), which is adjacent to the connector 70, serves as the GND of the drive device 60. It should be noted that the metal case of the drive device 60 may be received in another metal case or a resin case.

Also, the drive device 60 is electrically connected to the electric motor 40, which is received inside the second housing 20, via a wiring (not shown) that is led out from the bottom portion 11*a* of the front housing 11 into the first space 11*c*.

The drive device 60 is positioned on the flat surface 11*e* of the first outer wall surface 11*d* of the front housing 11 via an electrical-insulation sheet (not shown). Here, the drive device 60 is positioned on the portion of the first housing 10, to which the coupler 30 is fixed, such that the drive device 60 is located on an opposite side of the first housing 10 which is radially opposite to the coupler 30. In other words, the drive device 60 is positioned on the first outer wall surface 11*d* of the front housing 11 at the location that corresponds to the location of the coupler 30. That is, the front housing 11 of the first housing 10 is disposed between the drive device 60 and the coupler 30.

It should be noted that the electrical-insulation sheet is not necessarily required. The drive device 60 may be positioned on the flat surface 11*e* of the first outer wall surface 11*d* of the front housing 11 without the electrical-insulation sheet. The outer wall surface 61 of the drive device 60 and the first outer wall surface 11*d* of the front housing 11 may be integrally formed. Alternatively, the case of the drive device 60 and the front housing 11 may be integrally formed.

The connector 70 is a high-voltage connector for supplying electric power. The connector 70 is configured to be connected to a high-voltage harness (not shown), which connects a high-voltage battery or a power control unit for driving the vehicle to the drive device 60. The high-voltage harness has a shield structure for noise suppression. The connector 70 is coupled to the drive device 60 and projects toward the rear housing 13 from a side surface of the drive device 60 which faces the rear housing 13.

Like the high-voltage harness, the connector 70 includes a shield 71 which is disposed inside and is configured to conduct noise. The shield 71 is configured as a conductive path (e.g., conductive wire or wires) for conducting electrical noise. The shield 71 is electrically connected to the first outer wall surface 11*d* of the front housing 11 of the first housing 10. The shield 71 has a structure configured to electrically connect the refrigerant circuit module 1 to a shielding conductor (i.e., a conductive path for noise) of the high-voltage harness, in order to conduct electrical noise.

The shield 71 is electrically connected to the GND of the drive device 60. The overall structure of the refrigerant circuit module 1 is described above.

Next, the operation of the refrigerant circuit module 1 will be described. When the rotor 43 and shaft 41 are rotated by supplying the electric power to the electric motor 40, the movable scroll 51 revolves relative to the stationary scroll 52, i.e., performs an orbital motion. As a result, the working chamber 53 of the compression mechanism 50 is displaced from the radially outer side toward the center while reducing its volume.

Here, the working chamber 53, which is located at the radially outermost position and has the largest volume, is in communication with the first space 11*c* and the second space 21. Accordingly, the low-pressure refrigerant, which is supplied from the suction port of the front housing 11 into the first space 11*c* and the second space 21, is drawn into the working chamber 53, which has the largest volume. At this time, when the low-pressure refrigerant, which has the low temperature, flows through the first space 11*c* and the second space 21, the electric motor 40 is cooled, and the drive device 60 is also cooled via the wall of the front housing 11.

Then, as the working chamber 53 is displaced from the radially outer side toward the center while reducing its volume, the refrigerant inside the working chamber 53 is compressed. Furthermore, when the pressure of the refrigerant inside the working chamber 53 exceeds a valve-opening pressure of the reed valve 17 in response to the displacement of the working chamber 53 toward the center, the reed valve 17 opens, and thereby the high-pressure refrigerant in the working chamber 53 flows into the discharge chamber 16 through the discharge hole 54. The refrigeration oil is separated from the high-pressure refrigerant in the discharge chamber 16, and thereafter the high-pressure refrigerant is discharged from the discharge chamber 16 through the discharge port 18.

As described above, the refrigerant circuit module 1 can draw in, compress and discharge the refrigerant in the refrigeration cycle.

In the above configuration, when the electric motor 40 is rotated, electrical noise may be generated by the electric motor 40. As described above, the electric motor 40 is received in the second housing 20, and the second housing 20 is electrically connected to the first housing 10 via the coupler 30. When the first housing 10, which forms the outermost portion of the refrigerant circuit module 1, is separated from the second housing 20, which supports the electric motor 40, as in the present configuration, the path of the electrical noise generated by the electric motor 40 is changed. That is, the electrical noise flows from the second housing 20 to the first housing 10 via the coupler 30.

In the first housing 10, the electrical noise tends to flow more easily at a position adjacent to the coupler 30 due to lower resistance. In contrast, the electrical noise tends to flow less easily at a location farther from the coupler 30 due to higher resistance. In the present embodiment, the coupler 30, at which the first housing 10 and the second housing 20 are coupled, is located on the opening side of the front housing 11, i.e., is closer to the opening of the front housing 11 than to its bottom portion 11*a*.

Furthermore, in the present embodiment, the drive device 60, which circulates electrical noise to the vehicle side, is disposed at the location which corresponds to the location of the coupler 30 where the first housing 10 and the second housing 20 are coupled. In other words, the drive device 60 and the connector 70 are not positioned on the bottom portion 11*a* of the front housing 11 or on the bottom portion of the rear housing 13 in the first housing 10.

Figure 2:
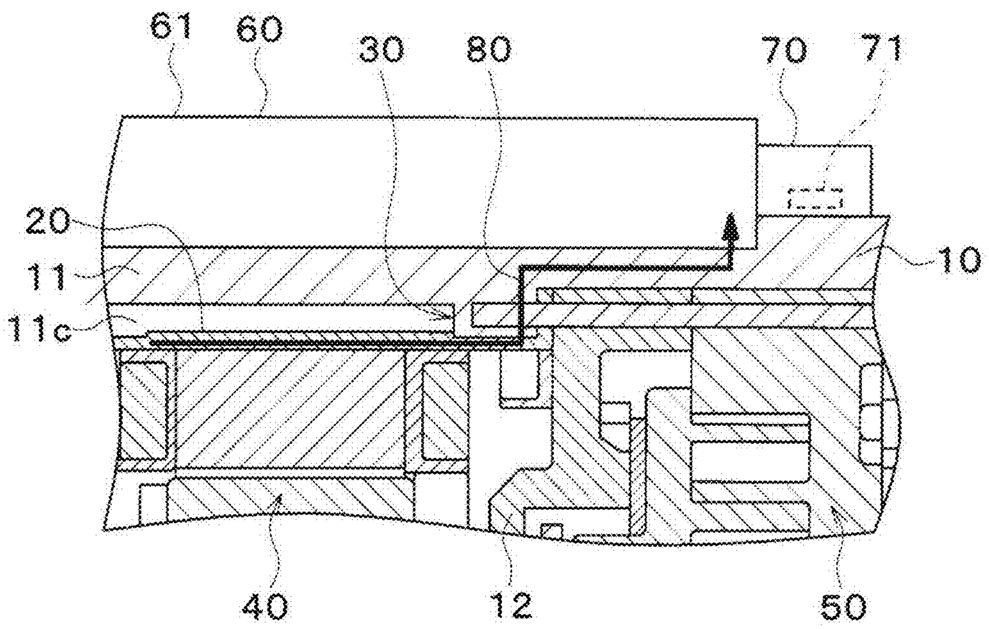
FIG. 2 is a partial cross-sectional view showing a first noise path.

Therefore, even when the first housing 10 is connected to the vehicle body GND 100, the vehicle body GND 100 is connected to the bottom portion 11*a*, which is located farther from the coupler 30 than the GND of the drive device 60, and thus the electrical noise is less likely to flow to the vehicle body GND 100. Specifically, even when the electrical noise flows throughout the second housing 20, as shown in FIG. 2, the electrical noise flows along a first noise path 80 that extends from the second housing 20 to the shield 71 of the connector 70 through the coupler 30, the front housing 11 of the first housing 10 and the outer wall surface 61 of the drive device 60. It should be noted that the electrical noise may also flow to the shield 71 via the GND of the drive device 60.

The electrical noise, which has flowed to the outer wall surface 61 of the drive device 60 via the first noise path 80, flows to the high-voltage battery through the high-voltage harness connected to the connector 70. That is, the electrical noise can be made to flow through a small conduction noise loop formed between the connector 70 and the high-voltage battery electrically connected to the connector 70. Here, the small conduction noise loop refers to a noise path in which the electrical noise does not flow to the vehicle body GND 100.

Accordingly, EMC characteristics can be improved compared to a case where the electrical noise flows through a large conduction noise loop formed by the electric motor 40, the vehicle body GND 100, the high-voltage battery, and the wiring that connects between the high-voltage battery and the electric motor 40. That is, degradation in the EMC characteristics can be suppressed in the refrigerant circuit module 1.

In addition, since the electrical noise, which flows through the large conduction noise loop, is reduced, the attenuation characteristics of the electrical filter, which is configured to attenuate the electrical noise, can be reduced in the drive device 60. Accordingly, the electrical filter of the drive device 60 can be downsized.

In the present embodiment, since the GND of the drive device 60 is located adjacent to the coupler 30, the distance from the first housing 10 to the drive device 60 becomes shorter than the distance from the first housing 10 to the vehicle body GND 100. Therefore, it is possible to make the electrical noise more likely to flow to the GND of the drive device 60.

Second Embodiment

Figure 3:
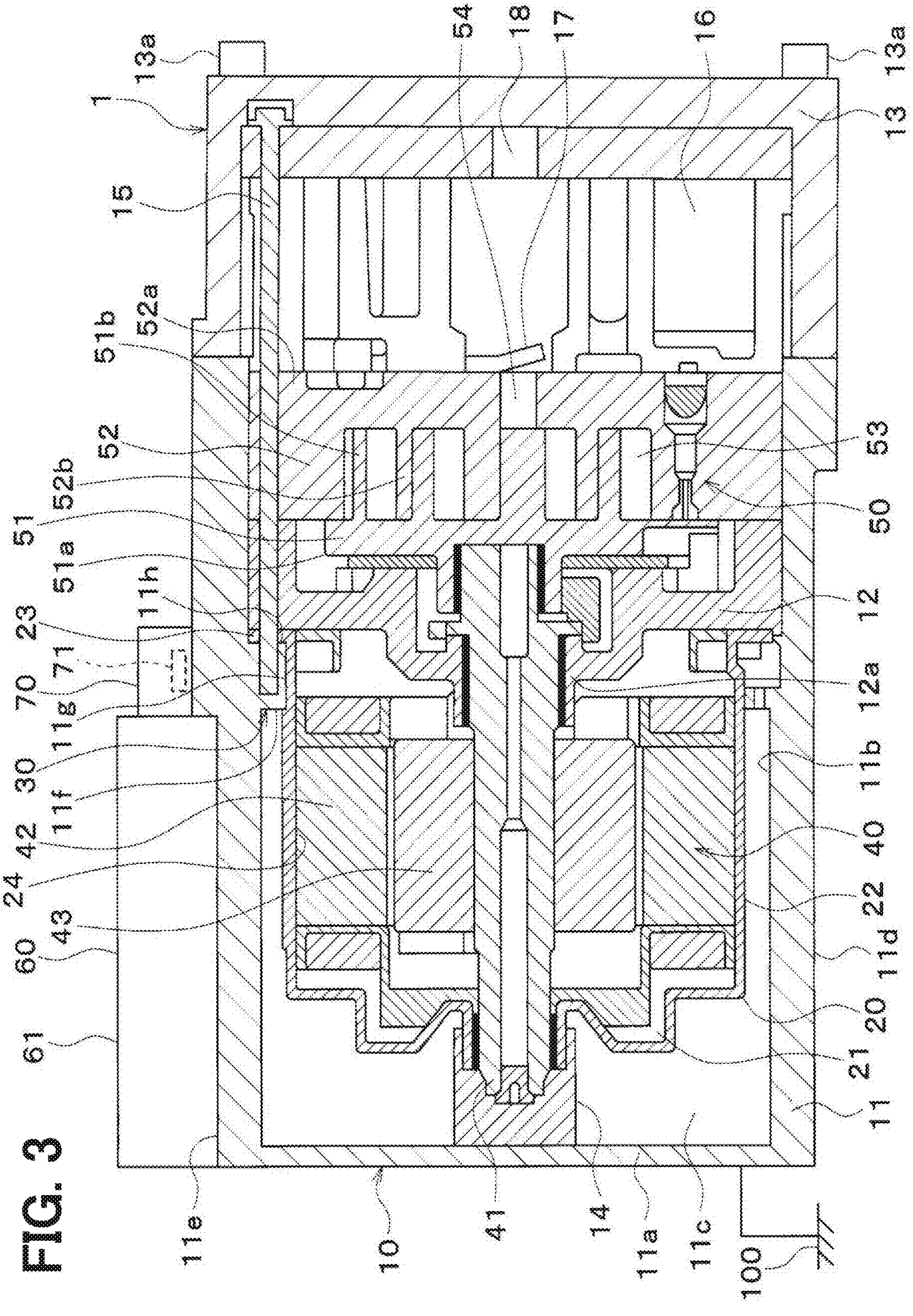
FIG. 3 is a cross-sectional view of a refrigerant circuit module according to a second embodiment.

In the present embodiment, points, which are different from the first embodiment, will be mainly described. As shown in FIG. 3, the connector 70 is positioned on a portion of the first housing 10, to which the coupler 30 is fixed, such that the connector 70 is located on the opposite side of the first housing 10 which is radially opposite to the coupler 30. In other words, the connector 70 is positioned on the first outer wall surface 11*d* of the front housing 11 at the location that corresponds to the location of the coupler 30.

Accordingly, the first noise path 80, which extends from the second housing 20 to the shield 71 of the connector 70 via the coupler 30 and the front housing 11 of the first housing 10, is configured to conduct the electrical noise. Accordingly, since the distance from the first housing 10 to the connector 70 is shortened, it becomes easier to conduct the electrical noise to the shield 71 of the connector 70.

Third Embodiment

Figure 4:
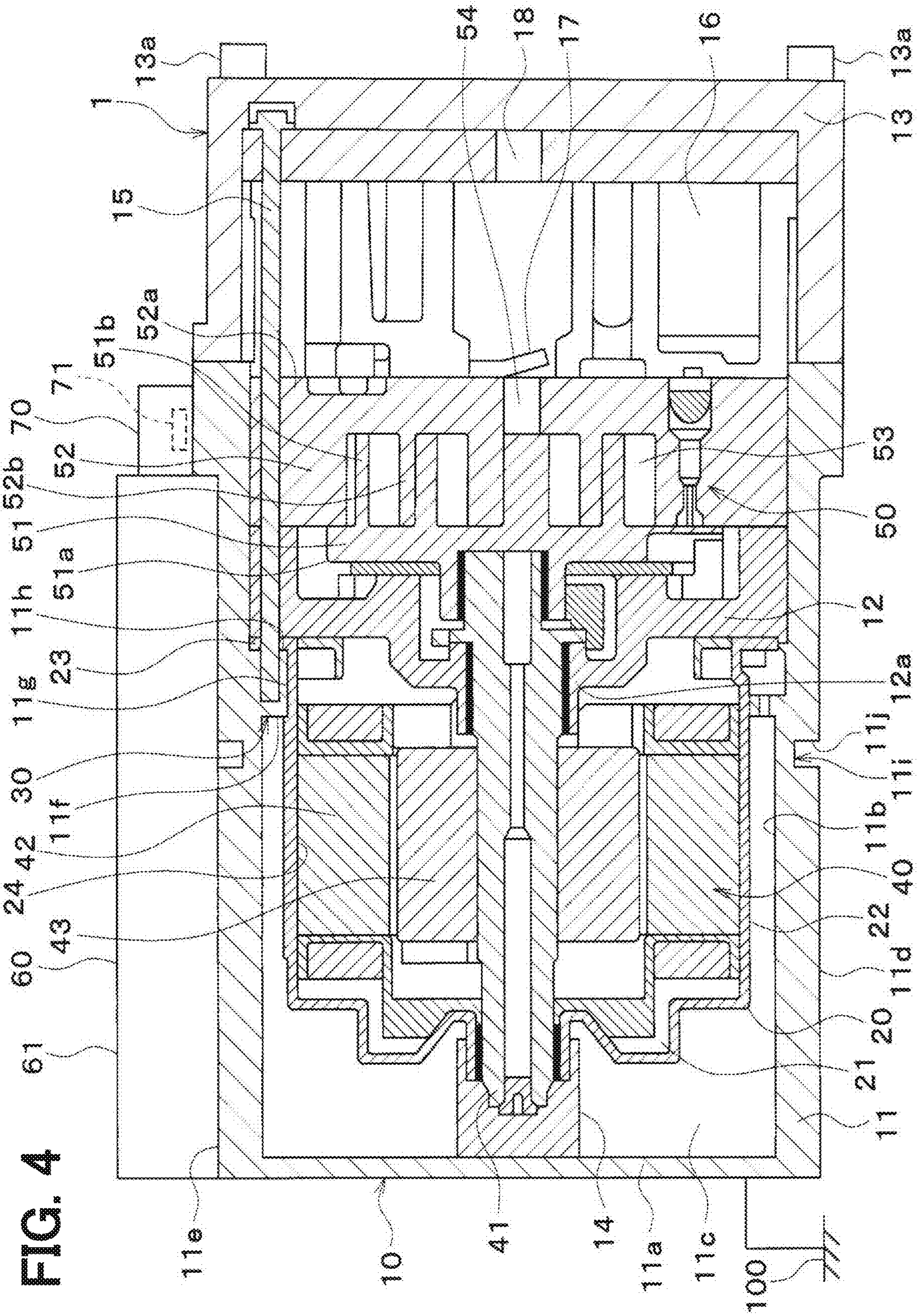
FIG. 4 is a cross-sectional view of a refrigerant circuit module according to a third embodiment.

In the present embodiment, points, which are different from the first and second embodiments, will be mainly described. In the present embodiment, as shown in FIG. 4, the first housing 10 includes a resistance increasing portion 11*i*. The resistance increasing portion 11*i* is a portion of the front housing 11 which is located between the one side portion (on the one side, i.e., the left side of the resistance increasing portion 11*i* in FIG. 4) and the other side portion (on the other side, i.e., the right side of the resistance increasing portion 11*i* in FIG. 4) of the front housing 11 in the axial direction of the shaft 41.

The resistance increasing portion 11*i* is formed as a groove 11*j* that has a thickness (radial wall thickness) smaller than the thickness of each of the one side portion and the other side portion of the front housing 11 in the first housing 10. The groove 11*j* is a portion of the front housing 11 that is thinned along the circumferential direction by forming the groove in the first outer wall surface 11*d* of the front housing 11. It is sufficient that the thicknesses of the one side portion and the other side portion of the front housing 11 are larger than the thicknesses of the groove 11*j*.

The resistance increasing portion 11*i* has a smaller cross-sectional area in the radial direction than the one side portion and the other side portion of the front housing 11. Accordingly, the resistance increasing portion 11*i* has a resistance (electrical resistance) that is higher than a resistance of each of the one side portion and the other side portion of the front housing 11.

The one side portion refers to a bottomed cylindrical tubular portion on the one axial side where the bottom portion 11*a* is located in the front housing 11. The one side portion of the front housing 11 is electrically connected to the vehicle body GND 100.

The other side portion refers to a cylindrical tubular portion on the other axial side where the opening is located in the front housing 11. The coupler 30 is fixed to the first inner wall surface 11*b* of the first housing 10 at the location that corresponds to the location of the other side portion of the first housing 10.

In the present embodiment, the GND of the drive device 60 is positioned on the first outer wall surface 11*d* of the first housing 10 at the location that is on the other side (the right side in FIG. 4) relative to the resistance increasing portion 11*i* in the axial direction. Also, the shield 71 of the connector 70 may be positioned on the first outer wall surface 11*d* of the first housing 10 at the location that is on the other side relative to the resistance increasing portion 11*i* in the axial direction. Furthermore, the drive device 60 and the connector 70 may be modified in a manner discussed in the second embodiment in view of FIG. 3 such that the shield 71 of the connector 70 is positioned on the first outer wall surface 11*d* of the first housing 10 at the location that corresponds to the location of the coupler 30.

With the above configuration, the resistance of the resistance increasing portion 11*i* in the front housing 11 of the first housing 10 is higher than the resistance of the other side portion of the first housing 10, so that electrical noise is less likely to flow from the other side toward the one side. Accordingly, the electrical noise can be more easily directed toward the other side, where the GND of the drive device 60 is located, rather than toward the one side of the front housing 11, which is connected to the vehicle body GND 100.

In addition, the portion of the front housing 11 is thinned along the circumferential direction. Accordingly, the high-resistance portion can be provided in the front housing 11 without dividing the front housing 11 into two parts.

Fourth Embodiment

Figure 5:
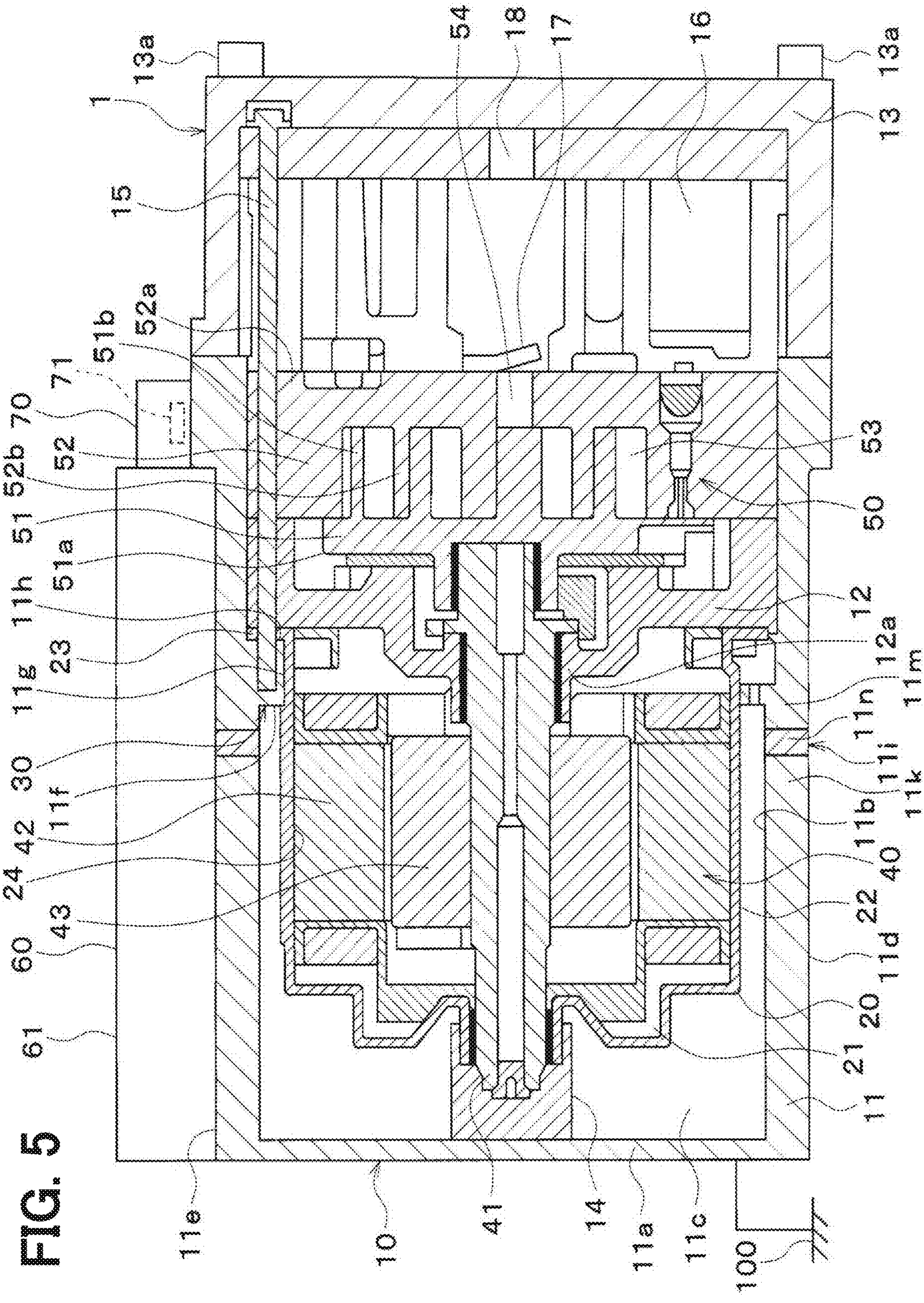
FIG. 5 is a cross-sectional view of a refrigerant circuit module according to a fourth embodiment.

In the present embodiment, points, which are different from the third embodiment, will be mainly described. In the present embodiment, as shown in FIG. 5, the front housing 11 of the first housing 10 is divided into a third housing 11*k*, which is positioned on the one side, and a fourth housing 11*m*, which is positioned on the other side.

In addition, as the resistance increasing portion 11*i*, a gasket seal 11*n* made of metal is clamped and fixed between the third housing 11*k* and the fourth housing 11*m*. Although not shown in the drawing, the third housing 11*k* and the fourth housing 11*m* are fixed together, for example, by screws or the like.

According to the above configuration, the physical properties of the gasket seal 11*n*, which serves as the resistance increasing portion 11*i*, can be made completely different from those of the first housing 10. Thus, the gasket seal 11*n* makes it difficult for the electrical noise to flow from the fourth housing 11*m* side to the third housing 11*k* side.

It should be noted that the front housing 11 of the first housing 10 is not limited to being divided into the two parts and may be divided into three or more parts. In that case, the gasket seal, which is the same as the gasket seal 11*n*, may be disposed between each adjacent two of the divided housings, or an object having different physical properties may be disposed between each adjacent two of the divided housings. Furthermore, the drive device 60 and the connector 70 may be modified in a manner discussed in the second embodiment in view of FIG. 3 such that the shield 71 of the connector 70 is positioned on the first outer wall surface 11*d* of the first housing 10 at the location that corresponds to the location of the coupler 30.

Fifth Embodiment

Figure 6:
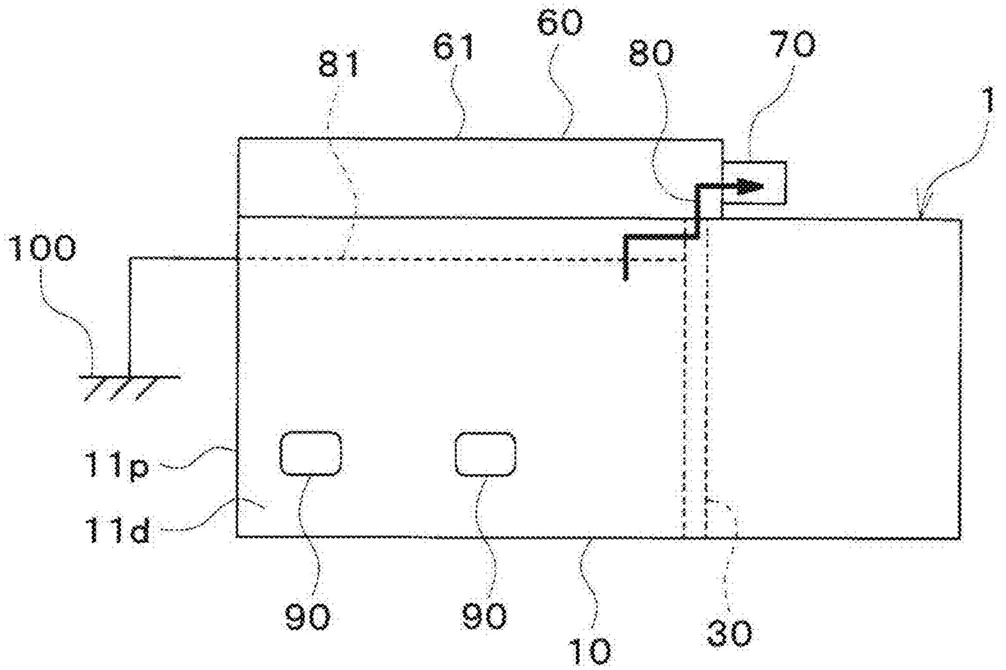
FIG. 6 is a side view of a refrigerant circuit module according to a fifth embodiment.

In the present embodiment, points, which are different from the above-described respective embodiments, will be mainly described. As shown in FIG. 6, the first housing 10 has functional components 90 that are positioned on the first outer wall surface 11*d* of the front housing 11. The functional components 90 are, for example, electronic components that operate at a low voltage.

In the example shown in FIG. 6, the vehicle body GND 100 is electrically connected to the drive device 60 side at a bottom surface 11*p* of the bottom portion 11*a* on the one side of the front housing 11. According to this configuration, the electrical noise flows along a second noise path 81 that extends at the one side portion of the front housing 11 from a location of the first outer wall surface 11*d*, which corresponds to the location of the coupler 30, to the vehicle body GND 100 with the shortest distance in the axial direction of the shaft 41.

Thus, the functional components 90 are positioned on the first outer wall surface 11*d* of the front housing 11 at a location (lower location in FIG. 6) that is opposite to the drive device 60 in a direction perpendicular to the axial direction, and this location serves as a location that is distant from the second noise path 81 on the first outer wall surface 11*d*. In other words, the functional components 90 are disposed at the location where the electrical noise is less likely to flow.

This makes it possible to reduce the influence of the electrical noise, which is generated at the high-voltage side, on the functional components 90 which operate at the low voltage. That is, it is possible to reduce the influence on the EMC characteristics of the functional components 90 that operate at the low voltage.

Figure 7:
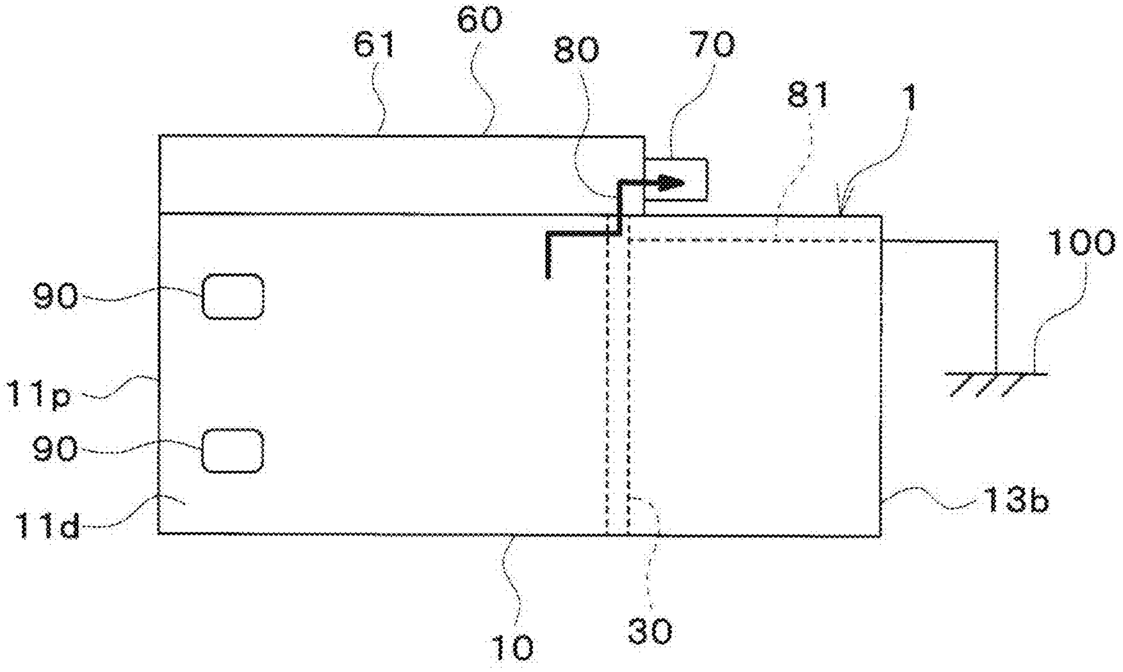
FIG. 7 is a side view of another refrigerant circuit module according to the fifth embodiment.

Alternatively, as in another example shown in FIG. 7, the vehicle body GND 100 may be electrically connected to the drive device 60 side at a bottom surface 13*b* of the rear housing 13. As a result, the second noise path 81 extends from the corresponding location of the first outer wall surface 11*d*, which corresponds to the location of the coupler 30, to the bottom surface 13*b* of the rear housing 13 with the shortest distance in the axial direction of the shaft 41.

Accordingly, the functional components 90 are positioned on the first outer wall surface 11*d* of the front housing 11 at the location adjacent to the bottom surface 11*p*. It should be noted that, with respect to the second noise path 81 shown in FIG. 7, the functional components 90 may also be arranged at the location shown in FIG. 6. It is only required that the functional components 90 are disposed at the location distant from the second noise path 81. The locations of the functional components 90 shown in FIGS. 6 and 7 are merely examples, and the functional components 90 may be disposed at any other location as long as it is distant from the second noise path 81 which is configured to conduct the electrical noise from the first housing 10 to the vehicle body GND 100. Also, the resistance increasing portion 11*i* of the third embodiment, or the resistance increasing portion 11*i* (the gasket seal 11*n*) together with the third housing 11*k* and the fourth housing 11*m* of the fourth embodiment, may be provided in the refrigerant circuit module 1 of the fifth embodiment shown in FIG. 6 or 7.

The present disclosure is not limited to the above-described embodiments and may be modified in various ways as follows without departing from the spirit of the present disclosure.

For example, the refrigerant circuit module 1 is not limited to the application in the refrigeration cycle of the vehicle air conditioning apparatus. The refrigerant circuit module 1 can be applied to a wide range of applications as a compressor for compressing any one of various fluids.

In the above-described embodiments, an electrically insulating element may be provided inside the drive device 60 to limit electrical noise from flowing from the other side toward the one side of the front housing 11.

The coupler 30 is not limited to being provided on the opening-side of the front housing 11 of the first housing 10. For example, the coupler 30 may be located on the bottom portion 11*a* side of the front housing 11, i.e., is closer to the bottom portion 11*a* than to the opening of the front housing 11. In this case, the connector 70 is also located on the bottom portion 11*a* side of the first outer wall surface 11*d* of the front housing 11. In addition, the vehicle body GND 100 is connected to the rear housing 13.

Although the present disclosure has been described with reference to the embodiments and the modifications, it is understood that the present disclosure is not limited to the embodiments and the modifications and structures described therein. The present disclosure also includes various variations and variations within the equivalent range. Also, various combinations and forms, as well as other combinations and forms that include only one element, more, or less, are within the scope and ideology of the present disclosure.

What is claimed is:

1. A refrigerant circuit module configured to compress a refrigerant, comprising:

an electric motor;

a first housing that has a first space;

a second housing that has a second space in which the electric motor is received, wherein the second housing is disposed in the first space of the first housing;

a coupler that is securely held relative to both a first inner wall surface of the first housing and a second outer wall surface of the second housing, wherein the coupler holds the second housing in the first space of the first housing such that the first inner wall surface of the first housing and the second outer wall surface of the second housing do not contact each other;

a drive device that is positioned on a first outer wall surface of the first housing, wherein the drive device is configured to drive the electric motor; and a connector that is coupled to the drive device and includes a shield which is configured to conduct electrical noise and is connected to an outer wall surface of the drive device that is electrically connected to the first outer wall surface of the first housing, wherein:

a first noise path, which extends from the second housing to the shield of the connector via the coupler, the first housing and the outer wall surface of the drive device, is configured to conduct the electrical noise generated by the electric motor;

the electric motor includes a shaft which is formed as a rotatable shaft;

the first housing includes a resistance increasing portion located between one side portion and another side portion of the first housing which are located on one side and another side, respectively, of the resistance increasing portion in an axial direction of the shaft, and the resistance increasing portion has a resistance that is higher than a resistance of the one side portion and a resistance of the another side portion;

the one side portion of the first housing is electrically connected to a vehicle body ground of a vehicle;

the coupler is fixed to the first inner wall surface of the first housing at a location that corresponds to a location of the another side portion of the first housing; and a ground of the drive device and the shield of the connector are positioned on the first outer wall surface of the first housing at a location that is on the another side relative to the resistance increasing portion in the axial direction.

2. The refrigerant circuit module according to claim 1, wherein the resistance increasing portion is a portion of the first housing that has a thickness smaller than a thickness of each of the one side portion and the another side portion of the first housing.

3. The refrigerant circuit module according to claim 1, wherein:

the first housing is divided into a third housing, which is positioned on the one side, and a fourth housing, which is positioned on the another side, and the resistance increasing portion is clamped and fixed between the third housing and the fourth housing.

4. The refrigerant circuit module according to claim 1, wherein the drive device is positioned on the first outer wall surface of the first housing at a location that corresponds to a location of the coupler.

5. The refrigerant circuit module according to claim 1, wherein the connector is positioned on the first outer wall surface of the first housing at a location that corresponds to a location of the coupler.

6. The refrigerant circuit module according to claim 1, comprising a functional component positioned on the first outer wall surface of the first housing, wherein:

the first housing is electrically connected to the vehicle body ground; and the functional component is positioned on the first outer wall surface of the first housing at a location that is distant from a second noise path which is configured to conduct the electrical noise from the first housing to the vehicle body ground.

* * * * *